United States Patent [19]

Hooper

[11] Patent Number: 4,522,163
[45] Date of Patent: Jun. 11, 1985

[54] STEPPED PISTON AND STEPPED PISTON ENGINE

[76] Inventor: Bernard Hooper, Maybank House, Hope St., Wordsley, Stourbridge, West Midlands, England, DY8 5QB

[21] Appl. No.: 459,062

[22] Filed: Jan. 18, 1983

[51] Int. Cl.³ .............................................. F01M 3/04
[52] U.S. Cl. ................................ 123/73 F; 123/193 P
[58] Field of Search .............. 123/193 P, 59 BS, 65 S, 123/73 F, 41.34, 41.35, 41.36

[56] References Cited

U.S. PATENT DOCUMENTS

| 989,391 | 4/1911 | Moser | 123/59 BS |
|---|---|---|---|
| 1,432,799 | 10/1922 | Stackhouse | 123/193 P |
| 4,013,057 | 3/1977 | Guenther | 123/193 P |

FOREIGN PATENT DOCUMENTS

| 884113 | 10/1971 | Canada | 123/193 P |
|---|---|---|---|
| 1208619 | 10/1970 | United Kingdom | 123/193 P |

Primary Examiner—Tony M. Argenbright
Assistant Examiner—David A. Okonsky
Attorney, Agent, or Firm—Alan H. MacPherson; Thomas S. MacDonald; Terrence E. Dooher

[57] ABSTRACT

A stepped piston for an engine of the kind having one or more cylinders, the or each cylinder containing a stepped piston having a pumping part of larger diameter, and a working part of smaller diameter, the working part of the piston being slidable in, and associated with, a working part of the cylinder in which combustion of a fuel/air mixture takes place, and the pumping part of the piston being slidable in, and associated with, a pumping part of the cylinder, the piston having a body with an interior hollow opening to the outside of a lower end of the piston, the body comprising a smaller diameter working part, extending from the top of the piston to a step, and a larger diameter, pumping, part extending from the step to a lower end of the piston, at least one piston ring groove formed in an outer surface of the smaller diameter part and at least one piston ring groove formed in the outer surface of the larger diameter part, each piston ring groove, in use, receiving a piston ring the smaller diameter part of the piston having at least one metering opening providing a through passage for lubricant, between the interior the piston and the outer surface of the smaller diameter part of the piston.

10 Claims, 5 Drawing Figures

STEPPED PISTON AND STEPPED PISTON ENGINE

BACKGROUND OF THE INVENTION

This invention relates to a stepped piston for use in a stepped piston internal combustion engine of the kind, hereinafter referred to as the kind specified, having one or more cylinders, the or each cylinder containing a stepped piston having a pumping part of larger diameter, and a working part of smaller diameter, the working part of the piston being slidable in, and associated with, a working part of the cylinder in which combustion of a fuel/air mixture takes place, and the pumping part of the piston being slidable in, and associated with, a pumping part of the cylinder.

Such engines do not rely upon crank case compression for charging the working part of the or each cylinder with the air/fuel mixture, but rather the mixture is delivered from the pumping part of the or each cylinder.

The lubrication of the usual crankshaft and connecting rod bearings, of such engines, and the larger diameter part of the piston and associated cylinder wall is at present provided in a highly rated, high speed, engine, by a lubricant circulatory system incorporating an oil pump and oil feed openings in the surfaces of the bearings to permit passage of lubricant to the bearings. The oil is contained in a sump built into a lower part of the engine or in a separate oil tank connected to the oil pump by feed and return pipes.

Alternatively, lubrication of the bearings in a lower cost, lower speed, engine is provided by oil contained in a sump immediately beneath the crankshaft, the connecting rod being provided with an extension or "dipper" which is partially immersed in the oil in the sump each time the crankshaft is at or near bottom dead centre position thereby causing oil to be splashed onto the bearing surfaces of the engine.

Thus the lubrication of the abovementioned parts is achieved without the complication of the more expensive systems.

In a stepped piston engine, the larger pumping part of the piston must be provided with efficient oil control piston ring(s) in order to avoid excessive oil consumption. The quantity of oil which escapes past the control ring or rings towards the smaller diameter part of the piston and the cylinder wall, is inadequate to provide lubrication between the piston surfaces, the piston rings and the associated cylinder wall of the smaller diameter part of the piston/cylinder and accordingly some further lubrication is required.

The lubrication requirements of the smaller diameter part of the cylinder and piston are similar to those of crankcase compression two stroke engines except for the considerable reduction in piston surface loading in the smaller diameter part of the stepped piston compared with the piston of the crank case compression engine. In the latter engines it is common practice to employ oil mist lubrication provided by either oil mixed into the fuel, or a metered oil supply provided by a precision, variable supply, oil pump driven from the crankshaft, the oil delivery being controlled in relation to the throttle opening of the carbureter.

When these methods of lubrication are used for two stroke engines, there is excessively high oil consumption, particularly compared with four stroke engines. In addition, the commonly seen exhaust smoke of these two stroke engines is unacceptable where exhaust pollution regulations are in force, and is undesirable in any application.

The smaller diameter part of the piston and cylinder of stepped piston engines may be lubricated by the above mentioned oil mist lubrication means, providing a functionally satisfactory engine, but with the same excessive oil consumption problem. This is as undesirable from the market viewpoint as it is when used on crank case compression engines.

Alternative means of lubrication have been proposed in crankcase compression engines using a precision oil metering pump to feed oil separately to the bearings and, in some engines, directly to the cylinder walls. This means can be applied for stepped piston engines by providing a metering pump to supply small quantities of oil direct to the cylinder wall of the smaller diameter part of the cylinder. This is functionally satisfactory but a cost penalty is incurred, since the metering pump and its drive gearing are additional to the normal lubrication system used for lubricating the bearings and large diameter pumping parts of the cylinder and piston.

An example of the use of such a system is provided by rotary piston engines which have been used in a large number of cars. Such engines commonly have a trochoidal piston in an epitrochoidal cylinder. These engines employ a circulation system fed by one oil pump to lubricate the main parts of the engine and a second oil pump of precision metering type, with throttle control variable delivery, to lubricate apex seals of the trochoidal piston and allied components exposed to the combustion process in the engine. The latter example is closely comparable with the lubrication requirements of stepped piston engines and provides the optimum solution to the problem of lubricating this type of engine prior to the means of piston and cylinder lubrication provided by the present invention.

SUMMARY OF THE INVENTION

It is an object of the present invention to provide a new or improved stepped piston for a stepped piston engine of the kind specified.

According to one aspect of the invention we provide a stepped piston for an engine of the kind specified the piston having a body with an interior hollow opening to the outside at a lower end of the piston, the body comprising a smaller diameter, working, part extending from the top of the piston to a step, and a larger diameter, pumping, part extending from the step to the lower end of the piston, at least one piston ring groove formed in an outer surface of the smaller diameter part and at least one piston ring groove formed in the outer surface of the larger diameter part each piston ring groove, in use, receiving a piston ring, the smaller diameter part of the piston also having at least one metering opening providing a through passage for lubricant between the interior of the piston and the outer surface of the smaller diameter part of the piston.

Preferably, the or each metering opening is located below the, or the lowest, piston ring groove in the smaller diameter part of the piston, the axial distance between said groove and the, or the closest, opening being less than 10% of the piston stroke.

Where two or more piston ring grooves are provided in the smaller diameter part of the piston, the or each metering opening may be located between the two, or the two lowest, piston ring grooves.

Preferably the or each metering opening communicates with a preferably shallow, recess in the outer surface of the smaller diameter part of the piston, to assist the distribution of the lubricant around the entire circumference of the piston ring.

The recess may be restricted to areas local to the metering opening or openings, to at least partially restrict the distribution of the lubricant and concentrate the supply of lubricant over limited parts of the circumference at the smaller diameter part of the piston. The recess may, at the point or points where the or each metering opening opens out into the outer surface of the smaller diameter part of the piston, be deeper locally to said point or points.

Alternatively, the recess may comprise a circumferential groove in the outer surface of the smaller diameter part of the piston, said groove being fitted, in use, with a piston ring to provide dispersed distribution of metered lubricant around the entire circumferential extent of the piston.

Lubricant therefore flows from the interior of the piston through the metering opening or openings into this additional groove and flows around the groove in a space behind the piston ring. The piston ring provides dispersed distribution of the lubricant by the clearances between side faces of the piston ring and side faces of the groove. However this arrangement may be modified by providing a close fitting piston ring having substantially no clearance between the side faces of the piston ring and the side faces of the groove, the ring being provided with metering orifices to control the flow of lubricant from the space behind the ring, said lubricant being fed to said groove by openings communicating with the interior of the piston. The close fitting piston ring may be prevented from rotating in the groove by a location peg or similar device. This ring which may be made from non-metallic material, then forms, in effect, an insert in the outer surface of the smaller diameter part of the piston. The purpose of this embodiment is so that passage between the interior of the piston and the external surface thereof may be through small passages, because very small orifices may be made in the close fitting piston ring more easily than is possible by merely drilling openings through the piston material.

Means may be provided to pivotally connect the piston to one end of a connecting rod which extends into the interior of the piston, each metering opening or openings being located in one of two thrust zones, as herein defined. The thrust zones are defined between pairs of longitudinal lines at the periphery of the smaller diameter part of the piston, and parallel with a plane containing the pivot axis, e.g. the axis of the gudgeon pin or other connecting means and the longitudinal axis of the piston, and displaced circumferentially approximately 30° either side therefrom.

The optimum control of the lubricant supply is provided where the or each metering opening is confined to only one of the two thrust zones of the piston, said zone being that which if the end of the crankshaft of the engine is viewed when rotating clockwise, faces outwardly of the piston, to the right.

In order to provide satisfactory lubrication without an excessive supply of lubricant, it is necessary to determine the optimum size of the metering opening or openings. For general use this may be determined in accordance with the following formula:

$$M = \frac{A}{K}(PN)^{\frac{3.7}{K}}$$

Where:
M is the total cross-sectional area of the metering opening in square millimeters,
A is the piston area of the smaller diameter part of the piston in square centimeters,
P is the brake mean effective pressure of the engine at maximum power, in atmospheres,
N is the engine speed at maximum power in revolutions per minute,
K is a factor dependent on the type of oil feed to the underside of the piston and the quantity of oil available at this position to supply the metering openings.

The factor K in extremes lies between 29 and 41 and for a specific engine design. This factor may be more closely defined as follows.

For engines with pressure fed oil circulation systems in the range commonly used on production four stroke engines, with lubrication of the underside of the piston by splash from the ends of each crank pin bearing, K would be between 32 and 35. Where a special oil supply to the underside of the piston is provided by an oil jet, K would be between 34 and 37.

Where lubrication is by means of a connecting rod-mounted oil dipper of normal proportions (commonly a sheet metal pressing of approximately 1.5 mm thickness passing through the oil as a blade only) the value of K would be between 31 and 35.

The connecting means between the connecting rod and piston may be by way of gudgeon pin or any other coupling to permit relative pivotal movement about a pivot axis as required by the crankshaft and connecting rod assembly. Alternative types of pivot means may include ball joints located at the pivotal axis and on the longitudinal axis of the piston.

According to a second aspect of the invention we provide a stepped piston engine of the kind specified having at least one stepped piston in accordance with the first aspect of the invention. The invention is particularly applicable where the stepped piston engine is a two stroke engine although may be applied to four stroke engines as required.

The engine may be a normal petrol engine wherein combustion of the fuel/air mixture within the engine is achieved by a spark ignition, or alternatively, may be of the diesel type wherein combustion of the fuel/air mixture within the engine is achieved solely by the compression of the mixture.

BRIEF DESCRIPTION OF THE DRAWINGS

The invention will now be described with the aid of the accompanying drawings in which.

DESCRIPTION OF THE PREFERRED EMBODIMENTS

Figure 1:
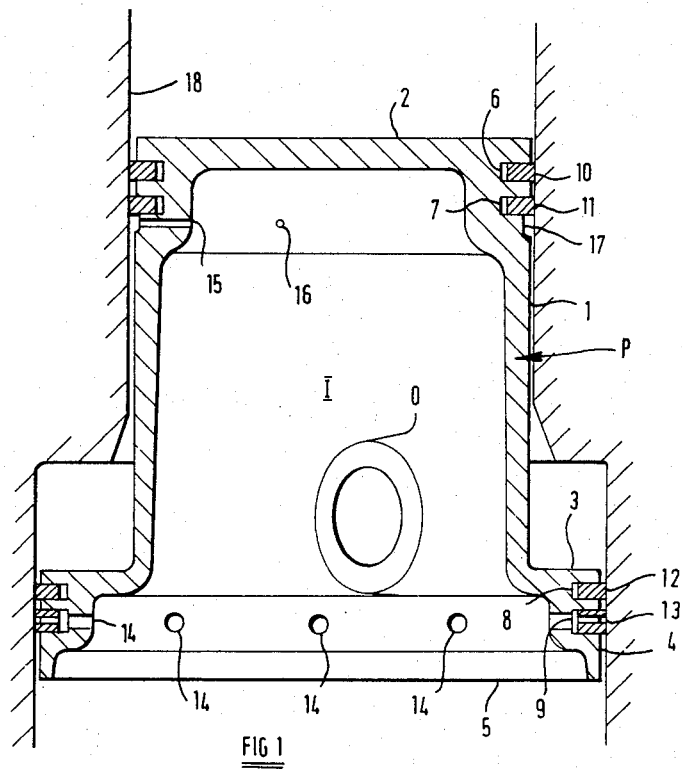
FIG. 1 is a section through the longitudinal axis of the stepped piston in accordance with the invention.

Referring to FIG. 1, there is shown a section through a stepped piston P in accordance with the first aspect of the invention. The piston P is provided with a smaller diameter part indicated at 1, extending from a top 2 of the piston to a step 3 thereof, and a larger diameter part 4 extending from the step 3 to an open lower end 5. Although as shown, the lower end 5 is completely open, if desired, inwardly extending shoulders could be provided or further alternatively, the lower end of the piston may merely have an opening therein. In each case, the piston has an interior hollow I.

In the example shown, the piston is provided with four piston ring grooves 6, 7, 8 and 9, the two grooves 6 and 7 being in the smaller diameter part 1 adjacent to the top of the piston, and the two grooves 8 and 9 being in the larger diameter part 4 of the piston between the step 3 and lower end 5. In another embodiment, only one piston ring groove need be provided in the smaller diameter part 1, and in the larger diameter part 4, provided that adequate sealing can be achieved.

Referring again to the figure, piston rings are fitted in each of the grooves 6 to 9. Plain compression type rings 10, 11 and 12 are fitted to the two grooves 6 and 7 in the smaller diameter part 1 and in the upper groove 8 in the larger diameter part 4 respectively, of the piston P. An oil control type of piston ring 13 is fitted in the lower groove 9 in the larger diameter part 4. It can be seen that oil drain holes 14 are provided which pass through the larger diameter part 4 of the piston, from the lower groove 9, to the hollow interior 1 of the piston. The drain holes 14 are required for the efficient functioning of oil control piston ring 13.

Oil metering openings 15 and 16 are drilled through the smaller diameter part 1 of the piston below the piston ring 11. The oil metering openings 15 and 16 provide communication from the outside of the smaller diameter part 1 to the hollow interior 1 of the piston. The oil metering openings 15 and 16 are adjacent to the lower ring groove 7 but the openings do not communicate with this groove 7. The openings 15, 16 are arranged to communicate with a circumferential groove 17 in the external surface of the piston. The groove 17 is adjacent to, and connects with, the groove 7.

The piston P is slidable in a cylinder 18 of an engine, which cylinder 18 has a smaller diameter part and a larger diameter part, the larger diameter part 4 of the piston being wholly received in the larger diameter part of the cylinder, whilst the smaller diameter part 1 of the piston is received in the smaller diameter part of the cylinder and slides, at least adjacent step 3, into the larger diameter part of the cylinder 18.

The section of FIG. 1 is taken through one of the oil metering openings 15 which it can be seen are circumferentially spaced to one side of an opening O in the piston wall. An aligned opening (not seen) is provided in an opposite portion of the circumferential piston wall, the openings O being adapted to receive a pin such as a gudgeon pin to permit the piston to be pivotally connected to a connecting rod of the engine as hereinafter described.

Figure 2:
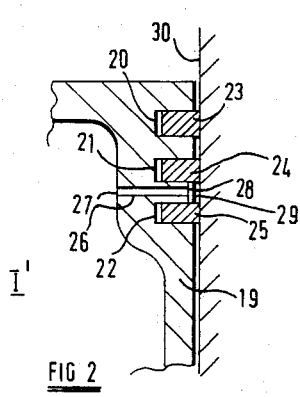
FIG. 2 is a part section through one oil metering opening and the smaller diameter part of a stepped piston showing an alternative embodiment of the invention.

Referring now to FIG. 2, there is shown an alternative embodiment of the invention. In place of the metering openings 15 and 16 opening into a groove 17 beneath the lower piston ring groove 7 in the smaller diameter part of a piston 19, three piston ring grooves 20, 21 and 22 are provided in the smaller diameter part of the piston adjacent the top 2 thereof, each piston ring groove 20, 21 and 22 being fitted with a piston ring 23, 24 and 25 respectively, an oil metering opening 26 being provided between the two lowermost rings 24 and 25.

At its inner end 27, the oil metering opening 26 communicates with the hollow interior I' of the piston and at its outer end 28, the opening 26 communicates with the external surface of the piston between the ring grooves 21 and 22. The area adjacent the outer end 28 of the oil metering opening 26, surrounding the opening 26, is provided with a recess 29 which is restricted to the local area of the opening 26.

In all other respect, the piston 19 shown in FIG. 2 is identical to that shown in FIG. 1, and thus the piston is slidable in a bore of a cylinder 30.

Figure 3:
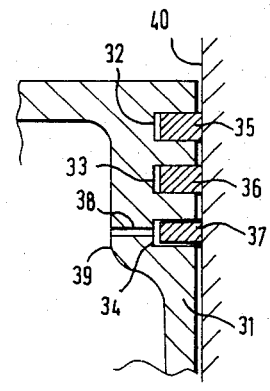
FIG. 3 is a part section similar to FIG. 2 showing another alternative embodiment of this invention.

Referring now to FIG. 3, another alternative embodiment of the invention is shown. Similar to the FIG. 2 embodiment, three piston ring grooves 32, 33 and 34 are provided, each of which is fitted with a piston ring 35, 36 and 37 respectively. An oil metering opening 38 is provided which communicates between the hollow interior 39 of piston 31, and the piston ring groove 34. A clearance between the sides of the piston ring 37 and the ring groove 34 provides a path for the metered oil to flow to the bore of cylinder 40 in which the piston 31 is slidable.

Again, in all other respects, the piston 31 is identical to that shown in FIG. 1.

Figure 4:
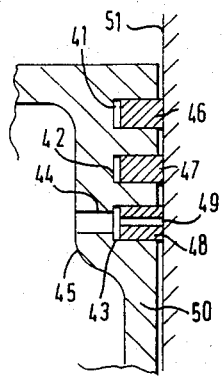
FIG. 4 is a part section similar to FIG. 2 showing a further embodiment of this invention.

Referring now to FIG. 4, a yet still further embodiment of the invention is shown wherein a piston 50 is again provided with the three piston ring grooves 41, 42 and 43, the lowermost groove 43 being provided with a series of openings one of which is shown at 44. The openings 44 each communicate with the hollow interior 45 of the piston. Normal piston rings 46 and 47 are fitted in the grooves 41 and 42, but a special piston ring 48 is fitted in the groove 43, the ring 48 having a close fit within the sides of the groove 43, the ring 48 having a close fit within the side of the groove 43 in order to ensure that oil flow past the sides of the ring 48 is prevented, or at least restricted to a negligible quantity.

The ring 48 is provided with oil metering openings, one of which is shown at 49, which openings 49 meter the oil from the interior 45 of the hollow piston 50, to a bore of cylinder 51 in which the piston 50 is slidable.

The ring 48 is prevented from rotating in the groove 43 about the piston axis by a stop peg or similar location device which is not seen in the drawing and thus the openings 44 always remain aligned with openings 49.

Once again, in all other respects, the piston 50 of FIG. 4 is identical to that shown in FIG. 1.

Figure 5:
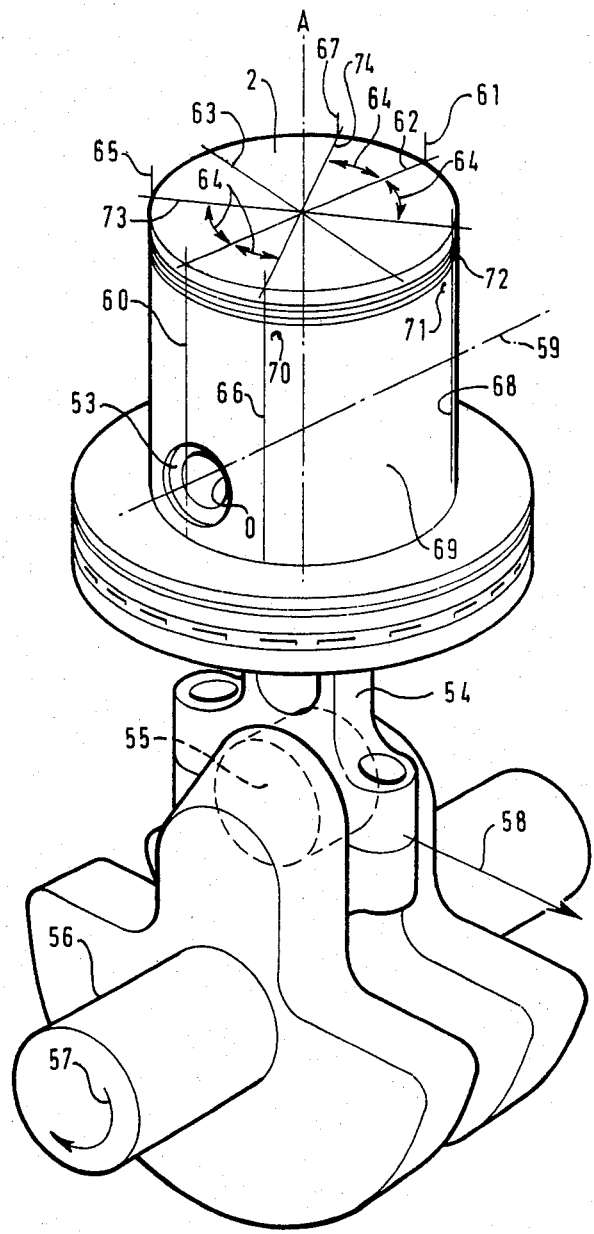
FIG. 5 is a perspective diagrammatic view of part of the stepped piston, connecting rod and crankshaft assembly of a single cylinder engine, showing a still further embodiment of the present invention.

Referring to FIG. 5, a stepped piston which may be of the type shown in FIG. 1 or FIG. 2 or FIG. 3 or FIG. 4 is shown connected to a connecting rod 54 by means of a gudgeon pin 53 which passes through the aligned openings O through the walls of the piston. The opposite end of the connecting rod 54 is shown connected to a crankshaft 56 by means of a crank pin 55. The assembly as shown is in the upper dead-centre position, the direction of rotation of the crankshaft being indicated by the arrow 57, i.e. clockwise as viewed. The gudgeon pin axis is shown at 59 and it can be seen that the gudgeon pin axis 59 and longitudinal axis A of the piston are mutually perpendicular but intersect and thereby lie in a common plane. The line 62 at the top 2 of the piston also lies within the plane containing axes A and 59, as do the lines drawn at 60 and 61 which are coincident with the side wall of the smaller diameter part of the piston. The plane which contains these lines and axes is perpendicular to an axis 63 which is the thrust axis of the piston. Two further lines 73 and 74 are transverse to the plane and are angularly displaced from line 62 by the angles indicated at 64. The angles 64 are generally equal to 30°. Where the lines 73 and 74 intersect the periphery of the piston, further lines 65, 66 67 and 68 are drawn parallel to plane P. A first thrust zone of the piston is defined between the lines 65 and 67, and a second thrust zone extends between opposite lines 66 and 68. The second thrust zone is indicated at 69 and faces outwardly of the external surface of the smaller diameter part of the piston to the right of the crank shaft 56 as viewed with the crankshaft rotating in a clockwise direction.

In the piston shown in FIG. 5, two oil metering openings 70 and 71 are shown which could be provided instead of or in addition to the oil metering openings described with reference to the FIGS. 1 to 4 embodiments. It can be seen that these openings 70 and 71 are drilled through the piston wall within the limits of the one thrust zone 69 only and adjacent to the lowermost edge of the piston rings 72 in the smaller diameter part of the piston.

It will be appreciated that the oil metering openings of the embodiments described above each provide for the passage of oil from the hollow interior of the piston to the external wall of the smaller diameter part thereof, to provide lubrication between the external wall of the piston and the bore of the smaller diameter part of the cylinder, in addition to conventional lubrication between the larger diameter part of the piston and associated larger diameter cylinder wall.

Oil which drains from the larger diameter part of the piston can pass through openings 14 to the interior of the piston for re-use, and thus burning of excess oil is minimised.

Instead of the gudgeon pin connection between piston and connecting rod 54 shown in FIG. 5, any other connection means which permits pivotal movement between the piston and rod 54 would alternatively be employed.

The invention is particularly applicable to two stroke diesel engines wherein ignition of the fuel/air mixture within the engine occurs solely due to compression of air, which causes heating of the air, into which compressed heated air, fuel is injected, the fuel being ignited by the heat present. Of course the invention could be applied to other types of stepped piston engines where improved lubrication between the piston and cylinder wall is required.

For example, the invention could equally be applied to a spark ignition two or four stroke stepped piston engine, or to a four stroke diesel stepped piston engine.

In each case, to provide satisfactory lubrication without an excessive supply of lubricant, it is necessary to determine the optimum size of the metering opening or openings. For general use this may be determined in accordance with the following formula:

$$M = \frac{A}{K}(PN)^{\frac{3.7}{K}}$$

Where:
M is the total minimum cross-sectional area of the metering opening in square millimeters,
A is the piston area of the smaller diameter part of the piston in square centimeters,
P is the brake mean effective pressure of the engine at maximum power, in atmospheres,
N is the engine speed at maximum power in revolutions per minute,
K is a factor dependent on the type of oil feed to the underside of the piston and the quantity of oil available at this position to supply the metering openings.

The factor K in extremes lies between 29 and 41 and for a specific engine design. This factor may be more closely defined as follows.

For engines with pressure fed oil circulation systems in the range commonly used on production four stroke engines, with lubrication of the underside of the piston by splash from the ends of each crank pin bearing, K would be between 32 and 35. Where a special oil supply to the underside of the piston is provided by an oil jet, K would be between 34 and 37.

Where lubrication is by means of a connecting rod-mounted oil dipper of normal proportions (commonly a sheet metal pressing of approximately 1.5 mm thickness passing through the oil as a blade only) the value of K would be between 31 and 35.

I claim:
1. A stepped piston for an engine of the kind having at least one cylinder, the cylinder comprising a pumping part of a first diameter and a working part of a second diameter, combustion of a fuel/air mixture taking place in the working part of the cylinder, the first diameter of the pumping part being greater than the second diameter of the working part, the piston comprising a body with a smaller diameter working part slidable in the working part of the cylinder, and a larger diameter pumping part slidable in the pumping part of the cylinder, the working part extending from the top of the piston to a step, and the pumping part extending from the step to a lower end of the piston, an interior hollow opening to the outside at the lower end of the piston, at least one piston ring groove formed in an outer surface of the working part of the piston, and at least one piston ring groove formed in another surface of the pumping part of the piston, each piston ring groove, in use, receiving a piston ring, at least two metering openings providing controlled flow of a predetermined amount of lubricant from the interior hollow to the outer surface of the working part of the piston, the total cross-sectional area of the openings being of an amount in the range determined according to the formula:

$$M = \frac{A}{K}(PN)^{\frac{3.7}{K}}$$

where M is the total cross-sectional area of the openings in square mm, A is the cross-sectional area of the working part of the piston in square cm, P is the brake mean effective pressure of the engine at maximum power in atmospheres, N is the engine speed at maximum power in revolutions per minute, and K lies between 29 and 41.

2. A stepped piston according to claim 1 wherein the metering openings are each located below the piston ring groove in the working part of the piston, the axial distance between said groove and the closest opening being less than 10% of the piston stroke.

3. A stepped piston according to claim 1 wherein at least two piston ring grooves are provided in the working part of the piston, the metering openings being located between two of said at least two piston ring grooves.

4. A stepped piston according to claim 1 wherein an opening from the interior hollow of the piston communicates with a circumferential groove in the outer surface of the working part of the piston, in which said groove, in use, a piston ring is provided, the piston ring being a close fitting piston ring having substantially no clearance between side faces of the piston ring and side faces of the groove in which the piston ring is received, the ring being provided with said metering openings to control the flow of lubricant.

5. A stepped piston according to claim 1 wherein means are provided to pivotally connect the piston to one end of a connecting rod, the metering openings each being located in one of two thrust zones defined between pairs of longitudinal lines at the periphery of the working part of the piston, and parallel with a plane containing the pivot axis and displaced circumferentially approximately 30° either side therefrom.

6. A stepped piston according to claim 1 wherein at least one of the two metering openings communicates with a recess in the outer surface of the working part of the piston.

7. A stepped piston according to claim 6 wherein the recess comprises a circumferential groove in the outer surface of the working part of the piston, said groove being fitted, in use, with a piston ring to provide dispersed distribution of the metered lubricant around the entire circumferential extent of the piston.

8. A stepped piston for an engine of the kind having at least one cylinder, the cylinder comprising a pumping part of a first diameter and a working part of a second diameter, combustion of a fuel/air mixture taking place in the working part of the cylinder, the first diameter of the pumping part being greater than the second diameter of the working part, the piston comprising a body with a smaller diameter working part slidable in the working part of the cylinder, and a larger diameter pumping part slidable in the pumping part of the cylinder, the working part extending from the top of the piston to a step, and the pumping part extending from the step to a lower end of the piston, an interior hollow opening to the outside at the lower end of the piston, at least one piston ring groove formed in an outer surface of the working part of the piston, and at least one piston ring groove formed in an outer surface of the pumping part of the piston, each piston ring groove, in use, receiving a piston ring, a metering opening providing controlled flow of a predetermined amount of lubricant from the interior hollow to the outer surface of the working part of the piston, the cross-sectional area of the opening being of an amount in the range determined according to the formula:

$$M = \frac{A}{K}(PN)^{-\frac{3.7}{K}}$$

where M is cross-sectional area of the opening in square mm, A is the cross-sectional area of the working part of the piston in square cm, P is the brake mean effective pressure of the engine at maximum power in atmospheres, N is the engine speed at maximum power in revolutions per minute, and K lies between 29 and 41.

9. A stepped piston engine of the kind having at least one cylinder, the cylinder comprising a pumping part of a first diameter, and a working part of a second diameter, combustion of a fuel/air mixture taking place in the working part of the cylinder, the first diameter being greater than the second diameter, and a stepped piston within said cylinder, said stepped piston comprising a body with a smaller diameter working part slidable in the working part of the cylinder, and a larger diameter pumping part slidable in the pumping part of the cylinder, the working part extending from the top of the piston to a step, and the pumping part extending from the step to a lower end of the piston, an interior hollow opening to the outside at the lower end of the piston, at least one piston ring groove formed in an outer surface of the working part of the piston, and at least one piston ring groove formed in an outer surface of the pumping part of the piston, each piston ring groove, in use, receiving a piston ring, at least two metering openings providing controlled flow of a predetermined amount of lubricant from the interior hollow to the outer surface of the working part of the piston, the total cross-sectional area of the openings being of an amount in the range determined according to the formula:

$$M = \frac{A}{K}(PN)^{-\frac{3.7}{K}}$$

where M is the total cross-sectional area of the openings in square mm, A is the cross-sectional area of the working part of the piston in square cm, P is the brake mean effective pressure of the engine at maximum power in atmospheres, N is the engine speed at maximum power in revolutions per minute, and K lies between 29 and 41.

10. A stepped piston engine according to claim 9 wherein combustion of the fuel/air mixture within the working part of the cylinder is achieved solely by compression.

* * * * *

UNITED STATES PATENT AND TRADEMARK OFFICE
CERTIFICATE OF CORRECTION

PATENT NO. : 4,522,163

DATED : June 11, 1985

INVENTOR(S) : Bernard Hooper

It is certified that error appears in the above—identified patent and that said Letters Patent is hereby corrected as shown below:

```
     On the title page immediately below [22]
insert the following:

[30]  Foreign Application Priority Data
     Jan. 19, 1982 [GB] United Kingdom........8201426
```

Signed and Sealed this

Fifteenth Day of October 1985

[SEAL]

Attest:

Attesting Officer

DONALD J. QUIGG

Commissioner of Patents and Trademarks—Designate